(12) United States Patent
Endo

(10) Patent No.: US 6,952,305 B2
(45) Date of Patent: Oct. 4, 2005

(54) ELECTROPHORETIC DISPLAY

(75) Inventor: Taro Endo, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/713,975

(22) Filed: Nov. 13, 2003

(65) Prior Publication Data

US 2004/0145796 A1 Jul. 29, 2004

(30) Foreign Application Priority Data

Nov. 13, 2002 (JP) .......................... 2002-329581
Nov. 10, 2003 (JP) .......................... 2003-380314

(51) Int. Cl.[7] .......................... G02B 26/08; G09G 3/34
(52) U.S. Cl. .......................... 359/296; 345/107
(58) Field of Search .......................... 359/296; 345/107

(56) References Cited

U.S. PATENT DOCUMENTS

| | | | | |
|---|---|---|---|---|
| 3,612,758 A | * | 10/1971 | Evans et al. ............... | 348/803 |
| 6,144,361 A | | 11/2000 | Gordon, II et al. ......... | 345/107 |
| 6,535,326 B2 | * | 3/2003 | Uno .......................... | 359/296 |
| 2002/0060836 A1 | | 5/2002 | Uno .......................... | 359/296 |
| 2003/0048521 A1 | | 3/2003 | Ikeda et al. ................ | 359/296 |

FOREIGN PATENT DOCUMENTS

JP          A 09-211499        8/1997

OTHER PUBLICATIONS

A copy of an International Search Report issued in PCT application No. PCT/JP 03/143380.

* cited by examiner

*Primary Examiner*—David N. Spector
(74) *Attorney, Agent, or Firm*—Morgan & Finnegan, LLP

(57) ABSTRACT

An electrophoretic display includes a first substrate and a second substrate disposed opposite to the first substrate, insulating liquid disposed between the first and second substrates, electrophoretic particles dispersed in the insulating liquid, a partition wall disposed at a position defining a pixel between the first and second substrates, and a first electrode and a second electrode, which are disposed on one of the first and second substrates, for applying an electric field to said electrophoretic particles. The first electrode is disposed in a scattering layer having a thickness of 1–100 μm and has an areal proportion of 0.1–80% per an area of the pixel. The second electrode constitutes a part of the partition wall.

15 Claims, 9 Drawing Sheets

(a)

(b)

(a)

(b)

ELECTROPHORETIC DISPLAY

FIELD OF THE INVENTION AND RELATED ART

The present invention relates to an electrophoretic display which effects display by moving charged particles between electrodes.

In recent years, with development of information equipment, the needs for low-power and thin display apparatuses have grown, so that extensive study and development have been made on display apparatuses fitted to these needs. Of these display apparatuses, a liquid crystal display apparatus has been developed actively as a display apparatus capable of meeting the needs and has been brought into the commercial stage. However, the now-available liquid crystal display apparatus is accompanied with such problems that it has poor viewability of characters on a picture area due to a viewing angle or reflection light and that it can cause severe eyestrain by flickering, low luminance, etc., of a light source. For this reason, a reflection type display apparatus has been expected from the viewpoints of low power consumption and reduction in eyestrain.

As one of such reflection type display apparatus, an electrophoretic display has been proposed by Harold D. Lees et al. (e.g., U.S. Pat. No. 3,612,758).

FIG. 16 shows an embodiment of a sectional structure of a conventional electrophoretic display. Referring to FIG. 16, the electrophoretic display includes a pair of substrates 1 and 2 oppositely disposed with a predetermined spacing, and electrodes 73 and 74 disposed on the substrates 1 and 2, respectively. At the spacing between the substrates 1 and 2, a partition wall 7 functioning as a spacer for defining the spacing and also as means for partitioning adjacent pixels is disposed. At each pixel, insulating liquid 5 and charged migrating particles 6 are disposed. In this electrophoretic display, the charged migrating particles 6 are electrically charged positively or negatively, so that they are adsorbed by either one of the electrodes 73 and 74 depending on a polarity of a voltage applied between the electrodes 73 and 74. In this case, the insulating liquid 5 and the charged migrating particles 6 are colored mutually different colors, so that the color of the charged migrating particles 6 is visually identified when the charged migrating particles 6 are adsorbed by the electrode 74 on a viewer side (FIG. 16(a)) and the color of the insulating liquid 5 is visually identified when the charged migrating particles 6 are adsorbed by the other electrode 73 (FIG. 16(b)).

Accordingly, by controlling the polarity of applied voltage pixel by pixel, it is possible to display various images. Hereinafter, such an electrophoretic display of the type wherein the charged migrating particles 6 are vertically moved is referred to as a "vertical movement type electrophoretic display".

However, such a vertical movement type electrophoretic display is required to be mixed therein with a color former (developer) such as dyes or ions. The presence of such a color former causes donation and reception of new electric charges, thus being liable to become an unstable factor. As a result, the electrophoretic display is lowered in performance, the life, and stability in some cases. For this reason, in order to solve such a problem, a display apparatus in which first and second electrodes are disposed along the same substrate, not on different (opposite) substrates has been proposed in Japanese Laid-Open Patent Application No. 6,535,326). The electrophoretic display has a sectional structure shown in FIG. 15 wherein a first electrode 3 and a second electrode 4 are disposed on the same substrate (substrate 1), and colored charged migrating particles 6 are caused to move (horizontally) along the substrate by applying a voltage between the electrodes 3 and 4. Hereinafter, such an electrophoretic display of the type wherein the charged migrating particles are moved horizontally along the substrate is referred to as a "horizontal movement type electrophoretic display".

In such a horizontal movement type electrophoretic display, in the case where insulating liquid 5 is made transparent, and a surface insulating layer 10 and charged migrating particles 6 are different colors a color (e.g., black) of the charged migrating particles 6 is visually identified when the charged migrating particles 6 are adsorbed by the second electrode 4, and a color (e.g., white) of the insulating layer 10 is visually identified when the charged migrating particles 6 are adsorbed by the first electrode 3. Display is thus effected. Incidentally, in FIG. 15, an auxiliary electrode 55 is disposed on the first electrode 3 and an auxiliary electrode 56 is disposed on the second electrode 4.

In the above-mentioned horizontal movement type electrophoretic display, the surface insulating layer 10 disposed on the first and second electrodes 3 and 4 may be used as a white scattering layer.

However, if the scattering layer 10 is made thick in order to enhance its scattering intensity, an electric field intensity in a particle movement area is lowered. As a result, there is a possibility that an increase in drive voltage is caused to occur. Further, a difference in electric field intensity between a central portion and a peripheral portion of a pixel becomes excessively large, so that when, e.g., an electric field intensity at the pixel central portion is at an appropriate level, there is also a possibility that it is difficult to create a uniform particle distribution over the entire display area due to an excessively large electric field intensity.

SUMMARY OF THE INVENTION

An object of the present invention is to provide an electrophoretic display capable of preventing increase in drive voltage and so on.

According to the present invention, there is provided an electrophoretic display, comprising:

a first substrate and a second substrate disposed opposite to the first substrate, insulating liquid disposed between the first and second substrates, electrophoretic particles dispersed in the insulating liquid, a partition wall disposed at a position defining a pixel between the first and second substrates, and a first electrode and a second electrode, which are disposed on one of the first and second substrates, for applying an electric field to said electrophoretic particles, wherein the first electrode is disposed in a scattering layer having a thickness of 1–100 μm and has an areal proportion of 0.1–80% per an area of the pixel, and the second electrode constitutes a part of the partition wall.

In the present invention, it becomes possible to effectively achieve a scattering effect by employing the scattering layer having a predetermined thickness. Further, the first electrode is disposed in the scattering layer and has an areal proportion of 0.1–80% per an area of pixel, whereby it is possible to effect good driving of the electrophoretic display without causing an increase in drive voltage even in the case where the scattering layer is made relatively thick in order to enhance a scattering intensity. In addition, by using the second electrode as a part of the partition wall, it is possible to suppress an electric field interference between adjacent pixels at a minimum level at the time of controlling the charged migrating particles.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, embodiments of the electrophoretic display according to the present invention will be described with reference to the drawings.

Figure 1:
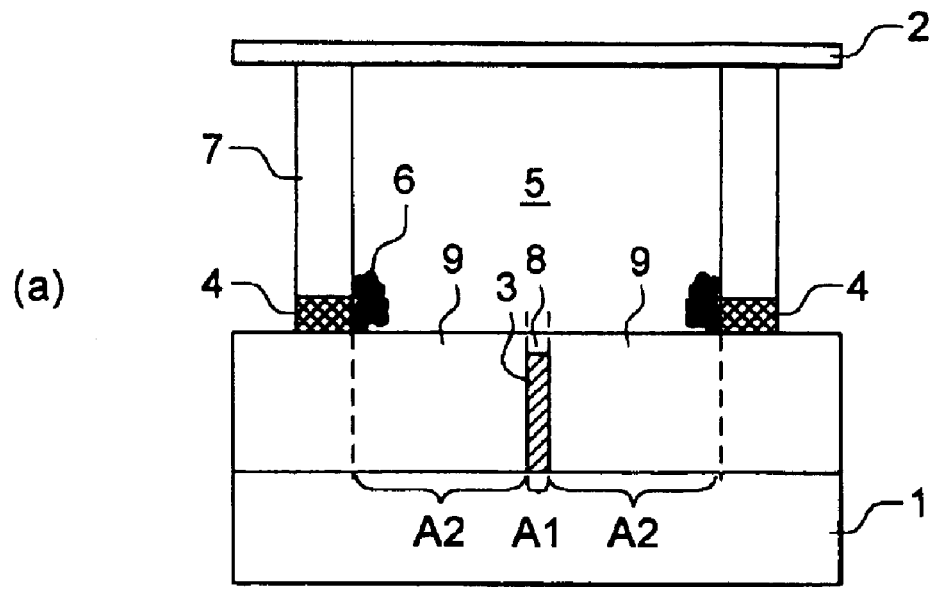
FIGS. 1(a), 1(b) and 2 are respectively a schematic sectional view showing an embodiment of a structure of the electrophoretic display according to the present invention.
Figure 1:
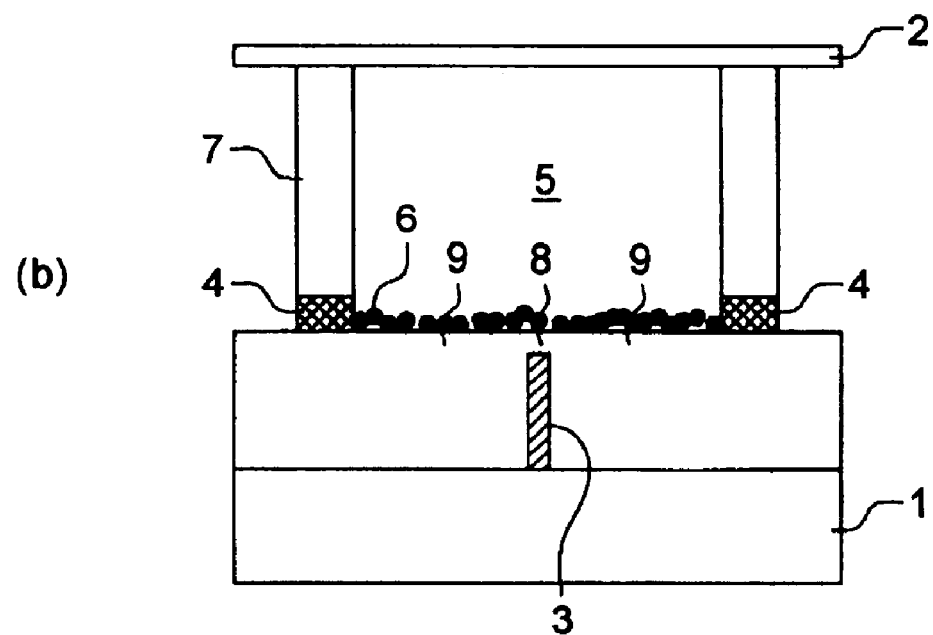

FIG. 1 is a schematic sectional structure of an embodiment of the electrophoretic display of the present invention, wherein a state of adsorption of charged migrating particles 6 by a second electrode 4 is shown at (a), and a state of adsorption of charged migrating particles 6 by a first electrode 3 is shown at (b).

Referring to FIG. 1, the electrophoretic display of the present invention includes a first substrate 1 and a second electrode 2 disposed opposite to the first substrate 1 with a predetermined spacing, the first electrode 3 disposed along the first substrate 1, the second electrode 4 disposed close to the first electrode 3, insulating liquid 5 disposed at the spacing between the first and second substrates 1 and 2, and a plurality of charged migrating particles 6 dispersed in the insulating liquid 5. In the electrophoretic display, a voltage is applied between these electrodes 3 and 4 to move the charged migrating particles 6 to the first electrode 3 side or the second electrode 4 side, thus effecting display.

The electrophoretic display further includes a partition wall 7 at the spacing between the first and second substrates 1 and 2. In the present invention, at least a part of the second electrode 4 may be disposed at a side surface of the partition wall 7, at a portion sandwiched between the partition wall 7 and the first substrate 1 at a portion sandwiched between the partition wall 7 and the second substrate 2 or within the partition wall 7.

The partition wall 7 may be formed after the second electrode 4 is formed on the first substrate 1.

It is also possible to form the second electrode 4 at the surface of the partition wall 7 which has been formed on the substrate. Further, the partition wall 7 provided with the second electrode 4 may be disposed on the substrate. In the present invention, the second electrode 4 is required to constitute a part of the partition wall 7. This is because an electric field interference between adjacent pixels is minimized at the time of controlling the charged migrating particles at a plurality of adjacent pixels to effectively perform accurate display.

Figure 2:
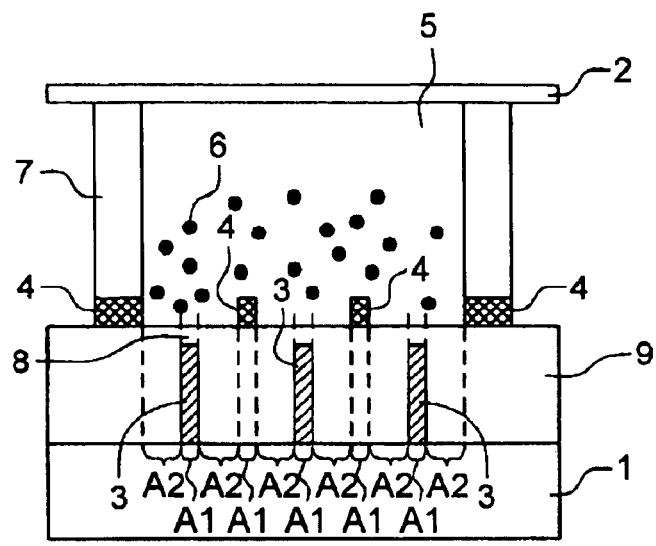

The partition wall 7 may be disposed so as to partition or divide an associated pixel portion into two pixels, i.e., at a boundary between the adjacent pixels, or disposed to define the spacing between the first and second substrates. In FIGS. 1 and 2, the partition wall 7 is disposed so as to partition the associated pixel portion.

At each pixel of the electrophoretic display shown in FIG. 1(a), a first scattering layer 8 is disposed so as to cover the first electrode 3 in a first region A1 (where the first electrode 3 is disposed) and a second scattering layer 9 which is thicker than the first scattering layer 8 is disposed in a second region A2 (a region other than the first region A1 at each pixel). Further, at each pixel, an areal proportion of the first electrode 3 for display is 0.1–80%, preferably 0.2–40%, more preferably 0.5–10%, per an area of each pixel. The thickness of the (second) scattering layer 9 is in the range of 1–100 $\mu$m, preferably 2–30 $\mu$m, more preferably 4–15 $\mu$m, in order to ensure a function as a scattering layer with reliability.

In the present invention, a distance between the first electrode 3 and the insulating liquid 5 is generally 0.05–10 $\mu$m, preferably 0.1–5 $\mu$m, more preferably 0.1–1 $\mu$m.

Incidentally, the first scattering layer 8 disposed in the first region A1 may have a thickness which is not uniform.

The scattering layer is a layer comprising ia matrix layer and a material which has a refractive index different from that of the matrix layer and is dispersed in the matrix layer, thus scattering light so that a reflection direction of light is not definite. The scattering layer may desirably be visually white. The matrix layer may be formed of a transparent resin such as acrylic resin or polystyrene. The material to be dispersed in the matrix layer may be titanium oxide, barium sulfate, etc.

In the case of preparing an electrophoretic display for color display, it is also possible to dispose a material layer for providing a desired color depending on color display move, on the scattering layer.

The above-mentioned first electrode 3 and second electrode 4 are respectively required to be disposed at each pixel. However, it is possible to use a plurality of either one or both of the first and second electrodes 3 and 4. For example, as shown in FIG. 2, three irs electrodes 3 and four second electrode 4 may b used in combination.

Figure 3:
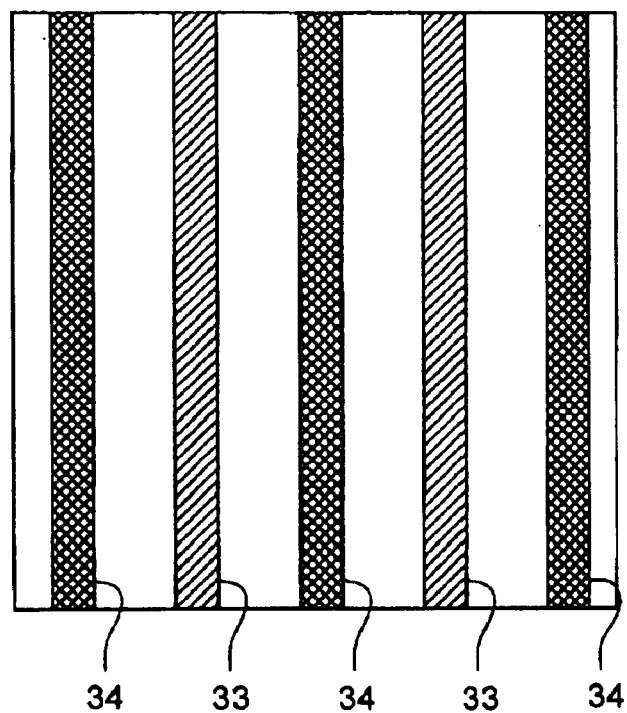
FIGS. 3 and 4 are respectively a schematic plan view for illustrating arrangement and configuration of a firs electrode and a second electrode.

Further, a shape of the first and second electrodes 3 and 4 is not particularly limited. For example, a first electrode 33 and a second electrode 34 may be disposed alternately in a stripe shape as shown in FIG. 3 or disposed so that a first electrode 3 is surrounded by a second electrode 4 as shown in FIG. 4.

Figure 4:
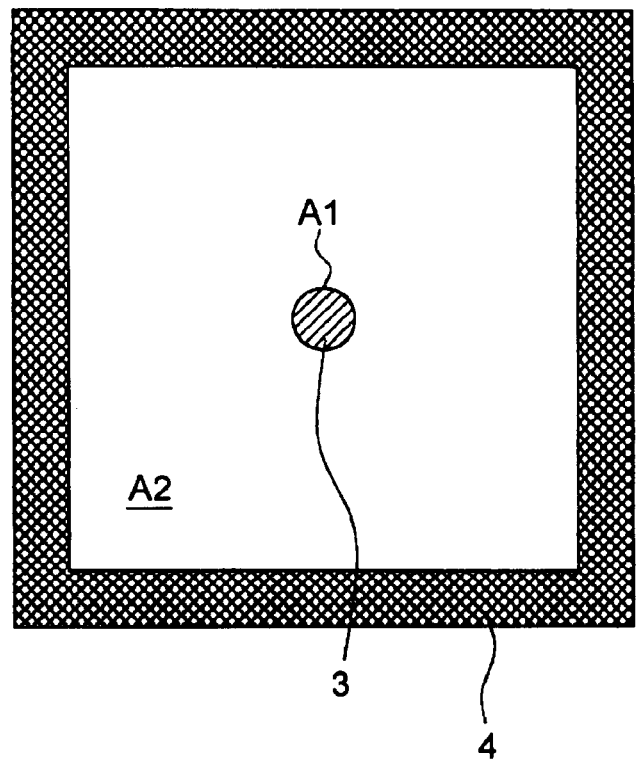
Figure 5:
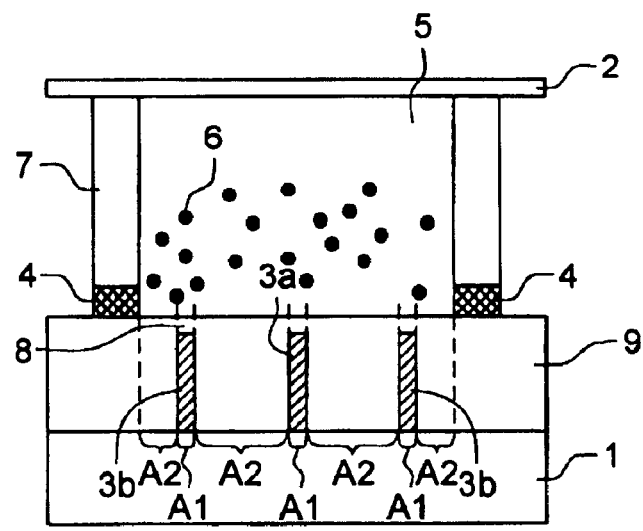
FIG. 5 is a schematic sectional view showing an embodiment of a structure of the electrophoretic display of the present invention.

The second electrode 4 in FIG. 4 is disposed in a rectangular frame shape but may be disposed in another shape, such a circular frame shape. Further, as shown in FIG. 5, it is also possible to adopt such an electrode arrangement that a first electrode 4a is disposed at a central portion of a pixel, other first electrodes 3b are disposed on the outer side of the first electrode 3a, and second electrodes 4 are disposed on the outer side of the first electrodes 3b. In this case, it is possible to apply the same voltage or different voltages to the first electrode 3a disposed at the central portion of pixel and the first electrodes 3b disposed outside the first electrode 3a.

With respect to the arrangement of the first and second regions A1 and A2, it is possible to employ such an arrangement, as shown in FIG. 4, that the first region A1 is disposed at the central portion of pixel and the second region A2 is disposed at the periphery of pixel so as to surround the A2. Alternatively, it is also possible to adopt such an arrangement that the first region A1 is disposed at the pixel central portion, the second region A2 is disposed to surround the first region, and another first region A1 is disposed to surround the second region A2.

In order to prevent, e.g., injection of charges into the colored charged migrating particles, a surface insulating layer may be formed on the first electrode, the second electrode, or the scattering layer.

In the present invention, the second electrode is required to constitute a part of the partition wall. By doing so, it is possible to suppress interference of electric field between adjacent pixels at the time of controlling the charged migrating particles.

Referring again to FIGS. 1((a), (b)), the electrophoretic display is, e.g., designed to have a pixel size of 100 μm×100 μm, a charged migrating particle size of 5 μm, a spacing between the first and second substrates of 70 μm, an areal proportion of electrode in the first region A1 to the entire pixel area of 0.5–10%, and an areal proportion of the second region A2 to the entire pixel area of 99.5–90%.

With respect to color arrangement in the present invention, it is possible to adopt any combination. For example, in the case where the colored charged migrating particles 6 and the second electrodes 4 are black and the first electrodes 3 are white, it is possible to switch white/black display mode. It is also possible to effect color display by appropriately arranging the first electrodes 3 and the second electrodes 4 at pixels to be visually identified as red (R), green (G), blue (B), etc. In this case, coloring may be performed with respect to areas per se in which the first and second electrodes are disposed without effecting to the first and second electrodes per se. More specifically, a coloring layer may be disposed on the electrode surface, or a part or all of the electrode may be made transparent and a coloring layer or a reflection layer may be disposed under the electrode.

The electrophoretic display in this embodiment is driven under conditions including a voltage Vd1 to be applied to the first electrodes 3, a voltage Vd2 to be applied to the second electrodes 4, and colored charged migrating particles 6 which are positively charged and colored black. The drive voltages Vd1 and Vd2 are, e.g., Vd1=−50 V and Vd2=+5 V for black display, and Vd1=+50 V and Vd2=−50 V for white display.

(Other Representative Embodiments)

FIG. 5 shows another embodiment of the electrophoretic display of the present invention.

Different from the arrangement shown in FIG. 2 (wherein the first region A1 of the first electrode 3 is disposed at the pixel central portion, the second region A2 is disposed to surround the first region A1, and the second electrodes 4 is disposed to surround the second region A2; as shown in FIG. 5, other first electrodes 3b may be disposed to surround second regions A2 between which a first region A1 of a first electrode 3a is disposed at a pixel central portion.

In this case, by applying different voltages to the central first electrode 3a and the outer first electrodes 3b, it becomes possible to effect drive suitable for movement of the colored charged migrating particles.

In this embodiment shown in FIG. 5, the electrophoretic display is, e.g., designed to have a pixel size of 100 μm×100 μm, a charged migrating particle size of 5 μm, a spacing between the first and second substrates of 70 μm, an areal proportion of electrode in the first region A1 to the entire pixel area of 10–20%, and an areal proportion of the second region A2 to the entire pixel area of 90–80%. With respect to color arrangement in this embodiment, it is possible to adopt any combination. For example, in the case where the colored charged migrating particles 6 and the second electrodes 4 are black and the first electrodes 3 are white, it is possible to switch white/black display mode. It is also possible to effect color display by appropriately arranging the first electrodes 3a and 3b and the second electrodes 4 at pixels to be visually identified as R, G, B, etc.

The electrophoretic display in this embodiment is driven under conditions including a voltage Vd1 to be applied to the central first electrodes 3a, a voltage Vd2 to be applied to the second electrodes 4, a voltage Vd3 to be applied to the outer first electrodes 3b, and colored charged migrating particles 6 which are positively charged and colored black. The drive voltages Vd1, Vd2 and Vd3 are, e.g., Vd1=−50 V, Vd2=+5 V, and Vd3=−20 V for black display, and Vd1=+50 V, Vd2=−50 V, and Vd3=+20 V for white display.

Figure 8:
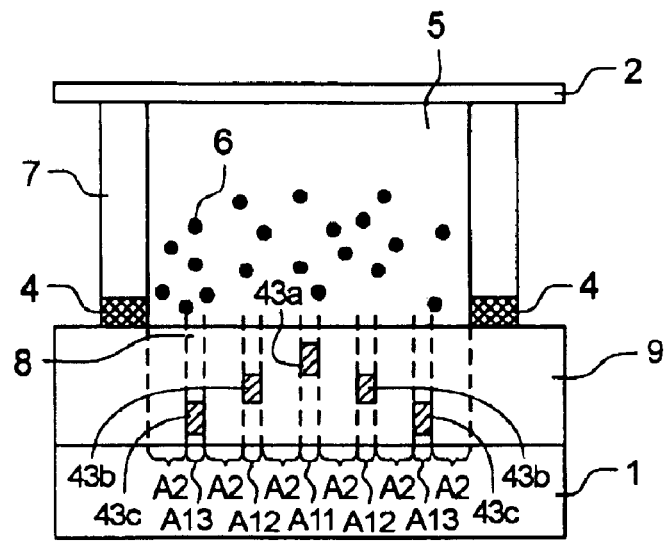
FIGS. 8 and 9 are respectively a schematic sectional view showing an embodiment of a structure of the electrophoretic display according to the present invention.

FIG. 8 shows still another embodiment of the electrophoretic display of the present invention.

As shown in FIG. 8, five first electrodes including a first electrode 43a at a central portion in a first region A11 where a thinner scattering layer is formed, two first electrodes 43b at an intermediary portion in a first region A12 where a relatively thicker scattering layer is formed, and two first electrodes 43c at an outer portion in a first region A13 where a thicker scattering layer is formed. The sum of areal proportions o these regions A11, A12 and A13 per the entire display area is not more than 80%. In this case, by applying the same voltage to all the first electrodes 43a, 43b and 43c present in the first regions A11, A12 and A13, respectively, it is possible to effect drive suitable for movement of the charged migrating particles 6.

In this embodiment shown in FIG. 8, the electrophoretic display is, e.g., designed to have a pixel size of 100 μm×100 μm, a charged migrating particle size of 5 μm, a spacing between the first and second substrates of 70 μm, and a total areal proportion of electrode in the first regions A11, A12 and A13 to the entire pixel area of 20–30%.

With respect to color arrangement in the present invention, it is possible to adopt any combination. For example, in the case where the colored charged migrating particles 6 and the second electrodes 4 are black and the first electrodes 43a, 43b and 43c are white, it is possible to switch white/black display mode. It is also possible to effect color display by appropriately arranging the first electrodes 43a, 43b and 43c and the second electrodes 4 at pixels to be visually identified as R, G, B, etc.

The electrophoretic display in this embodiment is driven under conditions including a voltage Vd1 to be applied to the central first electrode 43a, a voltage Vd2 to be applied to the second electrodes 4, a voltage Vd3 to be applied to the intermediary and outer first electrodes 43b and 43c, and colored charged migrating particles 6 which are positively charged and colored black. The drive voltages Vd1, Vd2 and Vd3 are, e.g., Vd1=−50 V, Vd2=+5 V and Vd3=−50 V for black display, and Vd1=+50 V, Vd2=−50 V and d3=+50 V for white display.

(Other Representative Embodiments)

FIG. 5 shows another embodiment of the electrophoretic display of the present invention.

(Materials for Constitutional Members and Preparation of Respective Layers)

As the first and second substrates 1 and 2, it is possible to use a plastic film of PET (polyethylene terephthalate), PC (polycarbonate), PES (polyether sulfone), or the like; glass, quartz, etc. As the substrate on the viewer side (second substrate 2), it is necessary to use a transparent material but as the other (opposite) substrate (first substrate 1), it is also possible to use a colored film of, e.g., PI (polyimide).

As materials for the first electrodes 3, 13, 23, 33, 43 and 53 and the second electrodes 4, 14, 24 and 34, any patternable electroconductive material may be used. For example, it is possible to use metals, such as titanium (Ti), aluminum (Al), copper (Cu), etc.; carbon or silver paste; an organic electroconductive film; and so on.

In the case of using the first electrodes also as a light reflection layer, a material possessing a high light reflectance, such as silver (Ag) or Al, may be used. In the case of using the first electrodes for white display, the electrode surfaces per se may be provided with a surface unevenness so as to cause diffuse reflection or a light scattering layer may be formed on the electrodes.

The partition wall 7 may be disposed so as to surround and define each pixel. By doing so, it is possible to prevent movement of the charged migrating particles between adjacent pixels. As a material for the partition wall 7, the same materials as the substrates may be used and a photosensitive resin such as acrylic resin may also be used. The partition wall 7 may be formed by any method including one wherein exposure and wet development are performed after applying a layer of the photosensitive resin, one wherein a separately prepared partition wall is adhered, and printing process.

As the liquid 5, it is possible to use a nonpolar transparent solvent such as isoparaffin, silicone oil, xylene, toluene or the like. As the charged migrating particles 6, it is possible to employ a material which is colored and possesses a good positively or negatively chargeable performance. Examples of the material for the charged migrating particles 6, various inorganic or organic pigments, carbon black and resins containing the pigments may be used. The charged migrating particles 6 may ordinarily have a particle size of 0.01–50 $\mu$m, preferably 0.1–10 $\mu$m.

In the above-mentioned liquid 5 or charged migrating particles 6, a charge control agent for controlling and stabilizing chargeability of the charged migrating particles 6 may be added. Examples of such a charge control agent include metal complex salts of monoazo dyes, salicylic acid, organic quaternary ammonium salts, nigrosin based compounds.

Further, in the insulating layer 5, a dispersing agent for preventing mutual flocculation of the charged migrating particles 6 and retaining a dispersion state may be added. Examples of such a dispersing agent may include polyvalent metal phosphates, such as calcium phosphate or magnesium phosphate; carbonates such as calcium carbonate; other inorganic salts; inorganic oxides; organic polymeric materials; etc.

Effects of the above-mentioned embodiments will be described.

According to the embodiments described above, the (total) areal ratio of the first region A1 in each pixel is in range of 0.1–80% and the second scattering layer 9 has a thickness larger than the first scattering layer 8, so that it is possible to effect good drive of the electrophoretic display without causing an increase in drive voltage even when the thicker scattering layer is formed in order to enhance a scattering intensity. Further, an electric field intensity in the first region A1 is substantially equal to that in the second region A2. As a result, in the case where the charged migrating particles 6 are attracted to the first electrode 3 side, a distribution of the charged migrating particles 6 is substantially uniform over both the first region A1 and the second region A2, so that display qualities can be improved.

Figure 6:
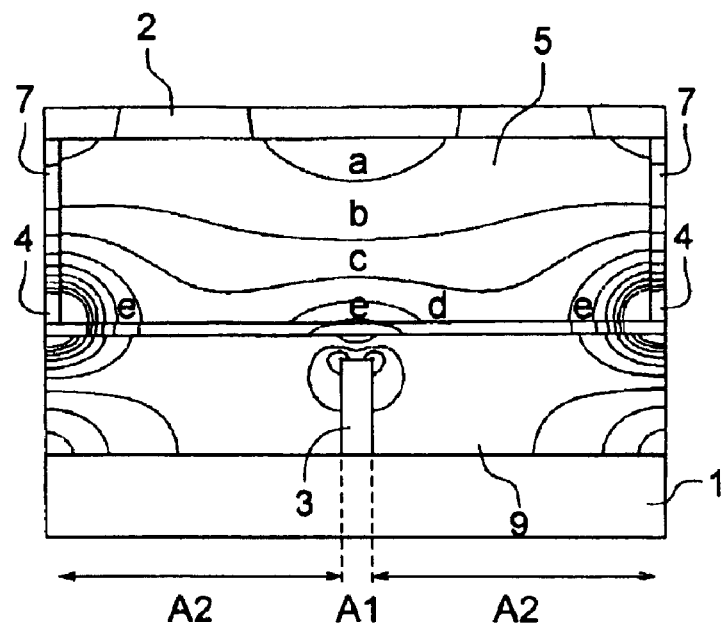
FIG. 6 is a view showing a result of electric field simulation for a representative structure of the electrophoretic display of the present invention.
Figure 7:
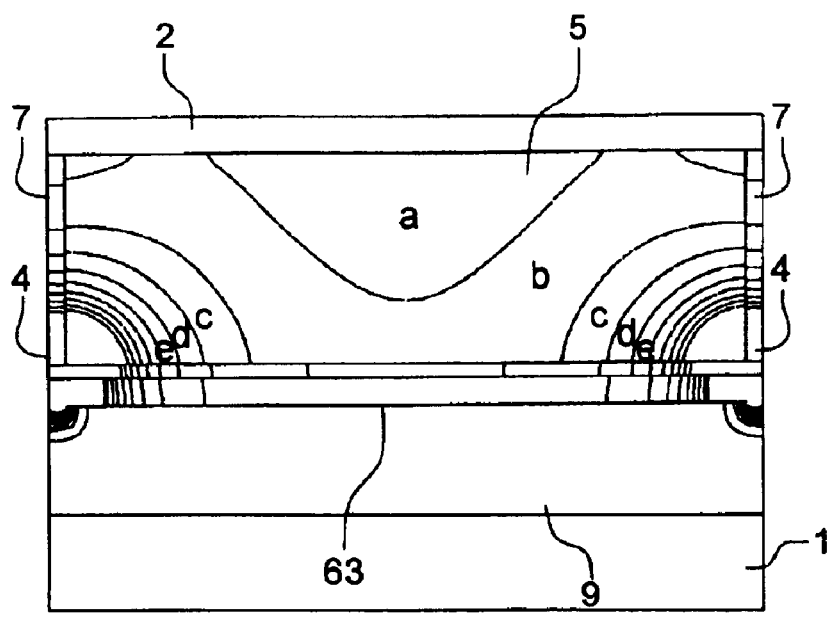
FIG. 7 is a view showing a result of electric field simulation for an embodiment of an electrophoretic display other than the electrophoretic display of the present invention.

FIG. 6 is a view showing a result of electric field emulation in the electrophoretic display shown in FIG. 1 as a representative embodiment of the electrophoretic display according to the present invention. FIG. 7 is a view showing a result of electric field emulation of an embodiment of an electrophoretic display shown in FIG. 13 other than the electrophoretic display of the present invention. The electrophoretic display shown in FIG. 13 is different from the electrophoretic display shown in FIG. 1 in that an areal proportion of a first electrode 63 in a first region A1 is not less than 90% per a corresponding pixel area (display area).

Referring to FIGS. 6 and 7, each of curves a, b, c, d, e is an equi-field strength curve obtained by plotting points having equal electric field strength. The electric field strength is increased in the order of a, b, c, d and e.

Figure 13:
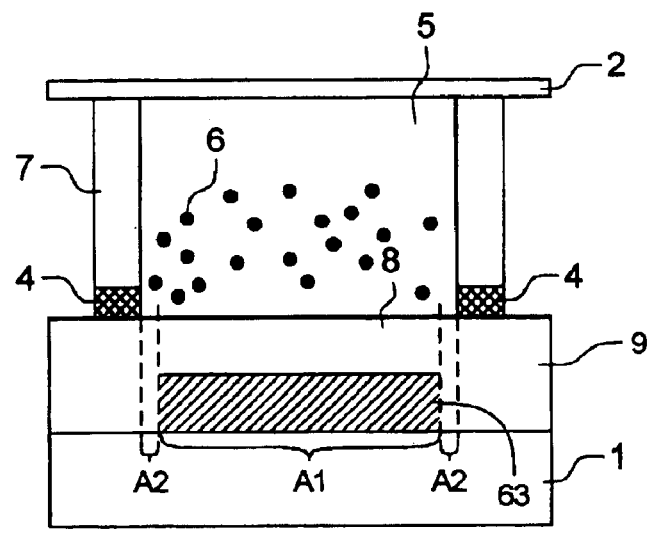
FIG. 13 is a schematic sectional view showing an embodiment of a structure of an electrophoretic display other than the electrophoretic display of the present invention.

In the case of the electrophoretic display shown in FIG. 13, as shown in FIG. 7, at a central portion of a first electrode 63, the electric field strength level is b which is relatively lower and is abruptly increased with a position closer to an electrode end in the order of c, d and e. In other words, the electric field is not uniform over the first electrode 63 surface.

On the other hand, in the electrophoretic display according to the present invention, as shown in FIG. 6, the electric field strength level in the first region A1 is e and that in most of the second region A2 is d, thus reducing a difference in electric field between the central portion and its surrounding portions in a display area. As a result, uniformity of electric field strength in the display area is increased, so that it is possible to provide an electric field suitable for movement of the colored charged migrating particles.

Hereinbelow, the present invention will be described more specifically based on Examples.

EXAMPLE 1

Figure 9:
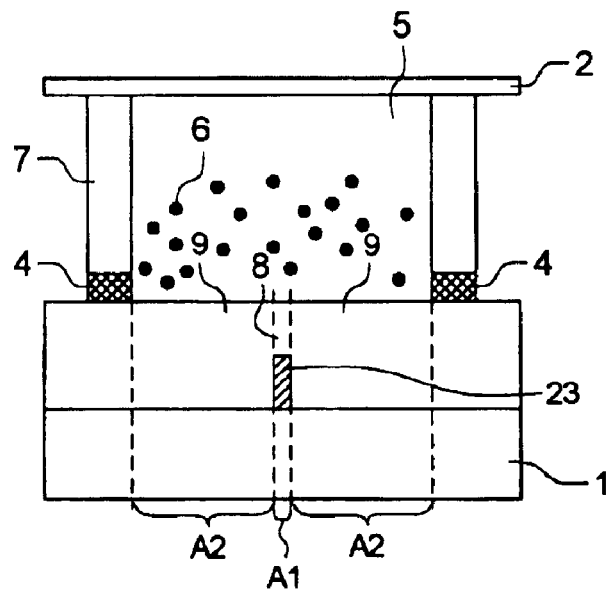
Figure 10:
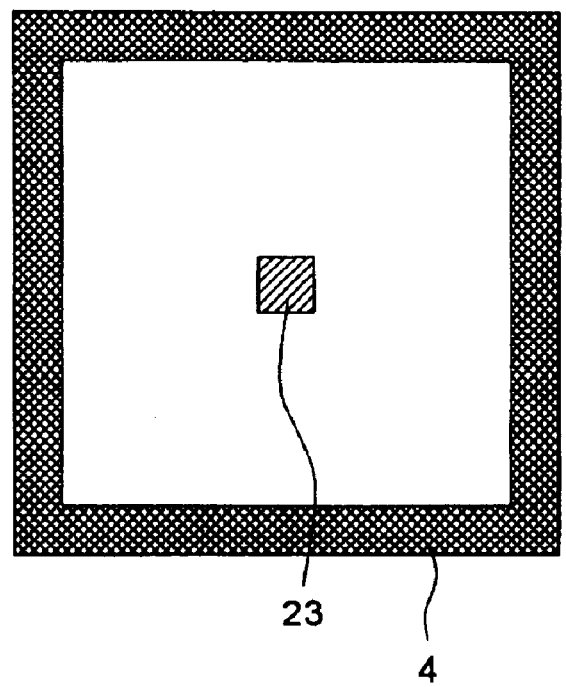
FIG. 10 is a schematic plan view for illustrating arrangement and configuration of a first electrode and a second electrode.

An electrophoretic display having a structure shown in FIGS. 9 and 10 was prepared. FIG. 9 is a sectional view thereof and FIG. 10 is a plan view thereof for illustrating an arrangement and configuration of first and second electrodes.

In this embodiment, a viewer (front) side substrate (second substrate) 2 and a rear side substrate (first substrate) 1 were disposed with a predetermined spacing. On the surface of the rear side substrate 1, a first electrode 23 and scattering layers 8 and 9 were disposed. Further, a second electrode 4 and a partition wall 7 were disposed at a boundary between adjacent pixels so as to partition the pixels. At each pixel, insulating layer 5 and charged migrating particles 6 were disposed. The partition wall 7 had a width of 5 μm and a height of 18 μm. The first electrode 23 was a square (10 μm×10 μm) and had a height of 1 μm. The second electrode 4 had a width of 5 μm and a height of 1 μm. Each pixel size was 100 μm×100 μm, and the number of pixels was 200×200.

The electrophoretic display was prepared in the following manner.

On a 1.1 mm-thick glass substrate (the rear substrate 1), an aluminum film was formed and subjected to patterning through photolithography and wet etching to form the first electrode 23. On the substrate 1, an acrylic resin layer (the scattering layers 8 and 9) containing titanium oxide was formed to cover the first electrode 23 and the surface of the substrate 1.

Then, on the resin layer 9, a titanium film was formed and subjected to patterning through photolithography and dry etching to leave only a pixel boundary portion to form the second electrode 4. On the second electrode 4, a dark black resin film (not shown) was formed. On the resin film, the partition wall 7 was formed by applying a photosensitive epoxy resin, followed by exposure and wet development.

Thereafter, in a recess portion surrounded by the partition wall 7, the insulating layer 5 (isoparaffin, trade name: "Isoper", mfd. by Exxon Corp.) and the charged migrating particles 6 (polystyrene-polymethylmethacrylate copolymer particles (particle size: 1–2 μm) containing carbon black) were filled. In the insulating layer 5 (isoparaffin), succinimide (trade name: "OLOA 1200", mfd. by Chevron Corp.) as a charge control agent was added in advance.

Then, the viewer side substrate 2 was adhered to the above-treated rear substrate 1, and a voltage application circuit was connected, thus preparing an electrophoretic display according to the present invention.

A voltage was applied between the first and second substrates 23 and 4 of the electrophoretic display in such a manner that a voltage Vd1 applied to the first electrode 23 was switched between +50 V and −50 V at an internal of 100 msec while retaining a voltage Vd2 applied to the second electrode 4 at 0 V. As a result, the colored charged migrating particles 6 were moved from one electrode to the other electrode without remaining on one electrode, thus providing a good contrast. In other words, it was possible to well drive the electrophoretic display without excessively increasing a drive voltage. Further, it becomes possible to uniformly dispose the charged migrating particles 6 over the first and second regions A1 and A2, thus improving display qualities.

EXAMPLE 2

Figure 11:
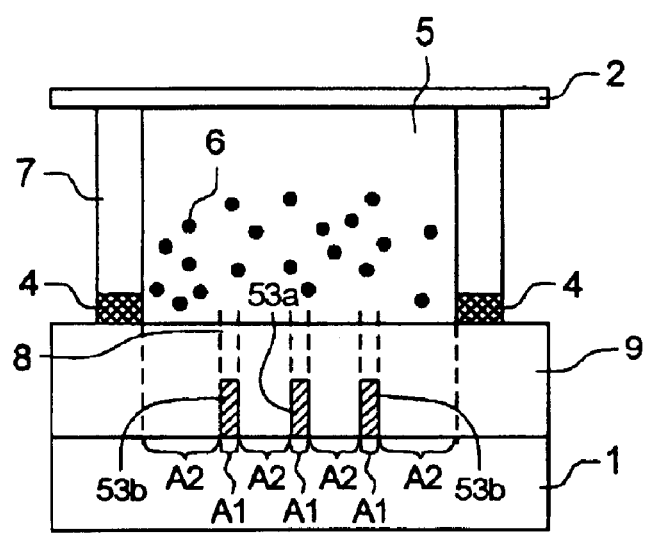
FIG. 11 is a schematic sectional view showing an embodiment of a structure of the electrophoretic display of the present invention.
Figure 12:
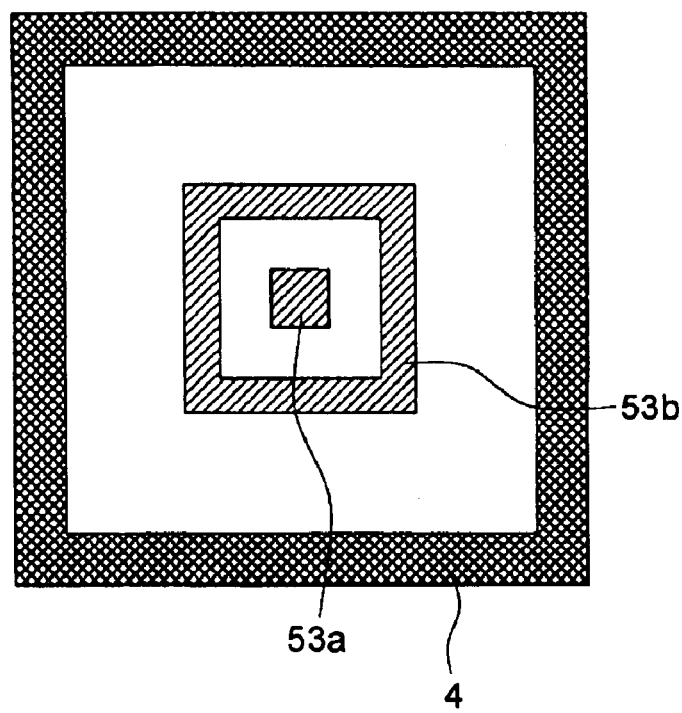
FIG. 12 is a schematic plan view for illustrating arrangement and configuration of a first electrode and a second electrode.

An electrophoretic display having a structure shown in FIGS. 11 and 12 was prepared. FIG. 11 is a sectional view thereof and FIG. 12 is a plan view thereof for illustrating an arrangement and configuration of first and second electrodes.

In this embodiment, a viewer (front) side substrate (second substrate) 2 and a rear side substrate (first substrate) 1 were disposed with a predetermined spacing. On the surface of the rear side substrate 1, a first electrode 23 and scattering layers 8 and 9 were disposed. Further, a second electrode 4 and a partition wall 7 were disposed at a boundary between adjacent pixels so as to partition the pixels. At each pixel, insulating layer 5 and charged migrating particles 6 were disposed. The partition wall 7 had a width of 5 μm and a height of 18 μm. The first electrode 53a disposed at a central portion was the same as the first electrode 23 used in Example 1. The electrophoretic display 53b (width=10 μm, length (vertical, horizontal)=50 μm, and height=1 μm) was disposed to surround the first electrode 53a. The second electrode 4 was the same as that used in Example 1 and disposed to surround the first electrode 53b.

Other dimensions were the same as those in Example 1.

The electrophoretic display was prepared in the same manner as in Example 1 except for changing the electrode arrangement to that shown in FIG. 12.

A voltage was applied between the first and second substrates 53a, 53b and 4 of the electrophoretic display in such a manner that a voltage Vd1 applied to the central first electrode 53a and a voltage Bd3 applied to the outer first electrode 53b were switched between a combination of +50 V (Vd1) and +20 V (Vd3) and a combination of −50 V (Vd1) and −20 V (Vd2) at an internal of 100 msec while retaining a voltage Vd2 applied to the second electrode 4 at 0 V. As a result, the colored charged migrating particles 6 were moved from one electrode (e.g., the first electrodes 53a and 53b) to the other electrode (e.g., the second electrode 4) without remaining on one electrode, thus providing a good contrast. In other words, it was possible to well drive the electrophoretic display without excessively increasing a drive voltage. Further, it becomes possible to uniformly dispose the charged migrating particles 6 over the first and second regions A1 and A2, thus improving display qualities.

COMPARATIVE EXAMPLE 1

Figure 14:
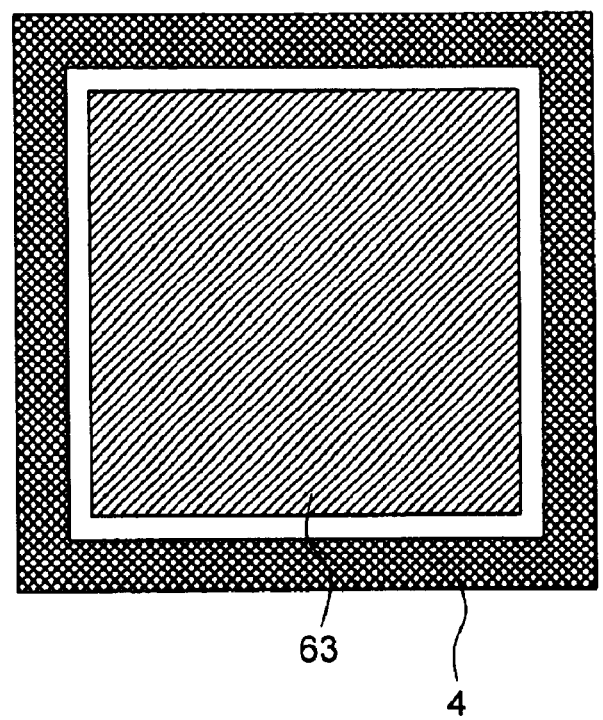
FIG. 14 is a schematic plan view for illustrating arrangement and configuration of a first electrode and a second electrode in an embodiment of an electrophoretic display other than the electrophoretic display of the present invention.
Figure 15:
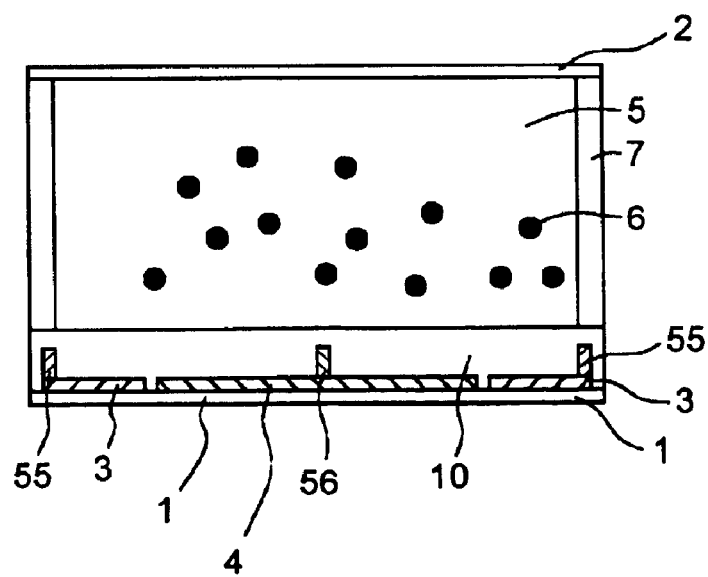
FIGS. 15 and 16 are respectively a schematic sectional view showing an embodiment of a structure of a conventional electrophoretic display of the present invention.
Figure 16:
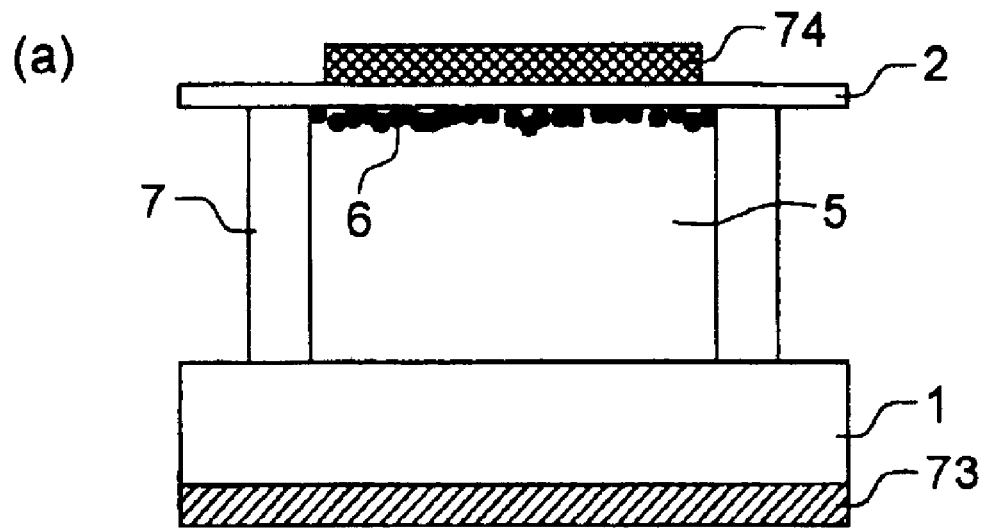
Figure 16:
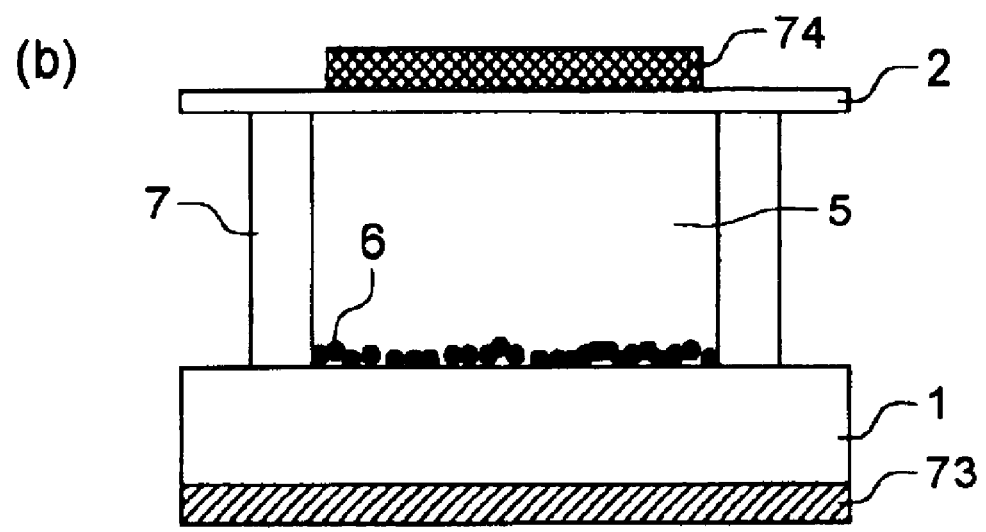

An electrophoretic display having a structure shown in FIGS. 13 and 14 was prepared in the same manner as in Example 1 except that a first electrode 63 (in place of the first electrode 23) was formed in a length of 95 μm, a width of 95 μm, and a height of 1 μm so as to substantially extend over the entire pixel.

A voltage was applied between the first and second substrates 23 and 4 of the electrophoretic display in such a manner that a voltage Vd1 applied to the first electrode 63 was switched between +50 V and −50 V at an internal of 100 msec while retaining a voltage Vd2 applied to the second electrode 4 at 0 V. As a result, the colored charged migrating particles 6 remained on the previous-state electrode at plural pixels (even after application of the switching voltage), thus lowering a contrast. This phenomenon is particularly noticeable at a central portion of the previous-state electrode.

As described hereinabove, according to the electrophoretic display of the present invention, it becomes possible to effectively achieve a scattering effect by employing the scattering layer having a predetermined thickness. Further, the first electrode is disposed in the scattering layer and has an areal proportion of 0.1–80% per an area of pixel, whereby it is possible to effect good driving of the electrophoretic display without causing an increase in drive voltage even in the case where the scattering layer is made relatively thick in order to enhance a scattering intensity. In addition, by using the second electrode as a part of the partition wall, it is possible to suppress an electric field interference between adjacent pixels at a minimum level at the time of controlling the charged migrating particles.

While the invention has been described with reference to the structures disclosed herein, it is not confined to the details set forth and this application is intended to cover such modifications or changes as may come within the purposes of the improvements or the scope of the following claims.

What is claimed is:

1. An electrophoretic display, comprising:
   a first substrate and a second substrate disposed opposite to said first substrate,
   insulating liquid disposed between said first and second substrates,
   electrophoretic particles dispersed in said insulating liquid,
   a partition wall disposed at a position defining a pixel between said first and second substrates, and
   a first electrode and a second electrode, which are disposed on one of said first and second substrates, for applying an electric field to said electrophoretic particles,
   wherein said first electrode is disposed in a scattering layer having a thickness of 1–100 $\mu$m and has an areal proportion of 0.1–80% per an area of the pixel, and said second electrode constitutes a part of said partition wall.

2. A display according to claim 1, wherein the areal proportion is 0.2–40%.

3. A display according to claim 2, wherein the areal proportion is 0.5–10%.

4. A display according to claim 1, wherein the scattering layer has a thickness of 2–30 $\mu$m.

5. A display according to claim 4, wherein the scattering layer has a thickness of 4–15 $\mu$m.

6. A display according to claim 1, wherein a distance between said first electrode disposed in the scattering layer and said insulating liquid is 0.05–10 $\mu$m.

7. A display according to claim 6, wherein the distance is 0.1–5 $\mu$m.

8. A display according to claim 7, wherein the distance is 0.1–1 $\mu$m.

9. A display according to claim 1, wherein the scattering layer in a region where said first electrode is disposed has a thickness smaller than that in another region.

10. A display according to claim 1, wherein the scattering layer has a flat surface on said insulating liquid side.

11. An electrophoretic display, comprising:
    a first substrate and a second substrate disposed opposite to said first substrate,
    insulating liquid disposed between said first and second substrates,
    electrophoretic particles dispersed in said insulating liquid,
    a partition wall disposed at a position defining a pixel between said first and second substrates, and
    a first electrode disposed along said first substrate and a second electrode constituting a part of said partition wall,
    wherein a first scattering layer is disposed in a region between said first electrode and said second electrode, and
    wherein an areal proportion of said first electrode to said pixel is 0.5–10%, and an areal proportion of the first scattering layer to said pixel area is 99.5–90%.

12. A display according to claim 11, wherein said first scattering layer is 1–100 m thickness.

13. A display according to claim 11, wherein said first electrode is covered by a second scattering layer which is thinner than said first scattering layer.

14. A display according to claim 11, wherein said first electrode and said second electrode are disposed alternately in a stripe shape.

15. A display according to claim 11, wherein said first electrode is surrounded by said second electrode.

* * * * *